June 16, 1942. J. V. BANKSON 2,286,947
HYDRAULIC HOIST
Filed July 25, 1941 2 Sheets-Sheet 1
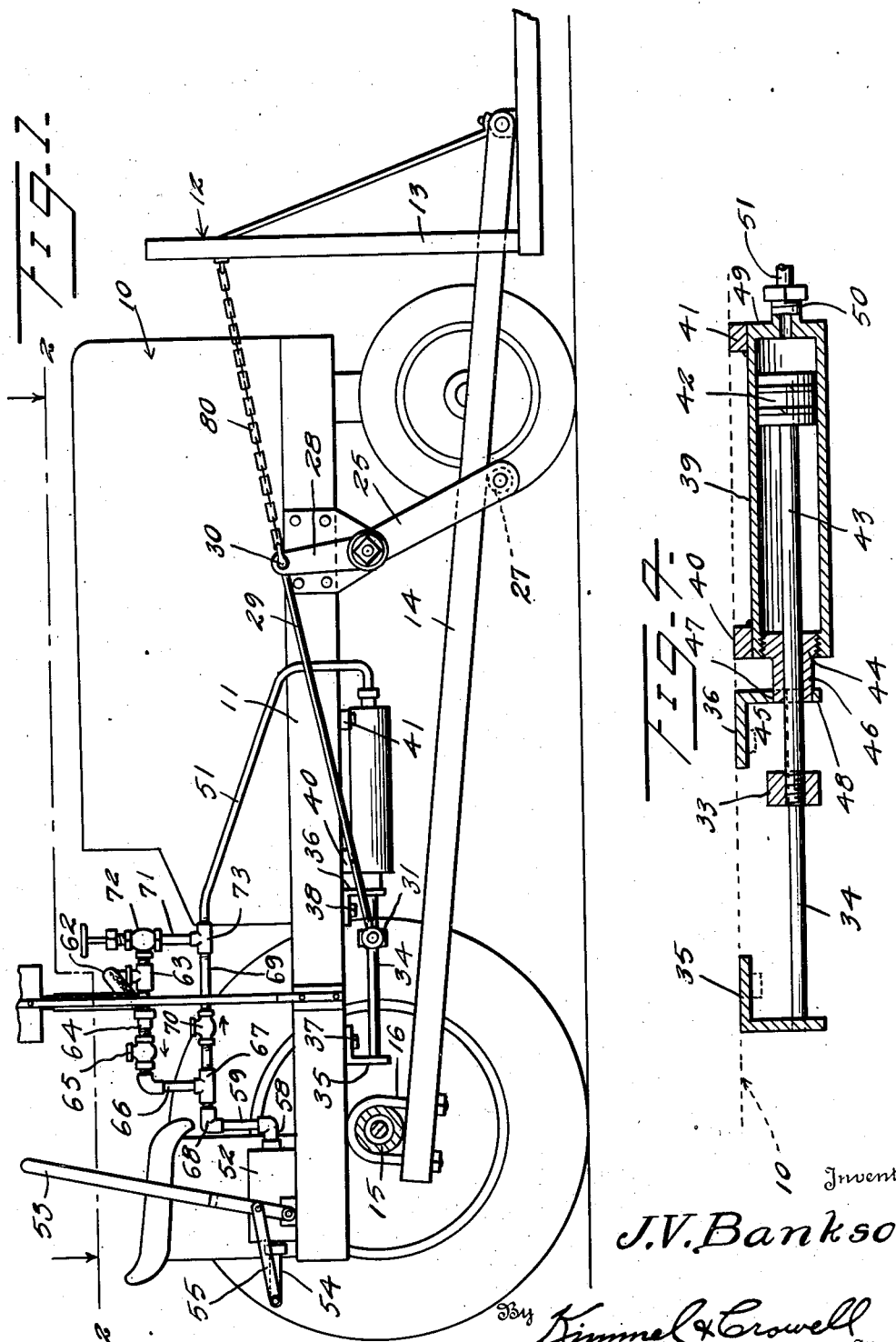
Inventor
J. V. Bankson
By Kimmel & Crowell
Attorneys June 16, 1942.　　J. V. BANKSON　　2,286,947
HYDRAULIC HOIST
Filed July 25, 1941　　2 Sheets-Sheet 2
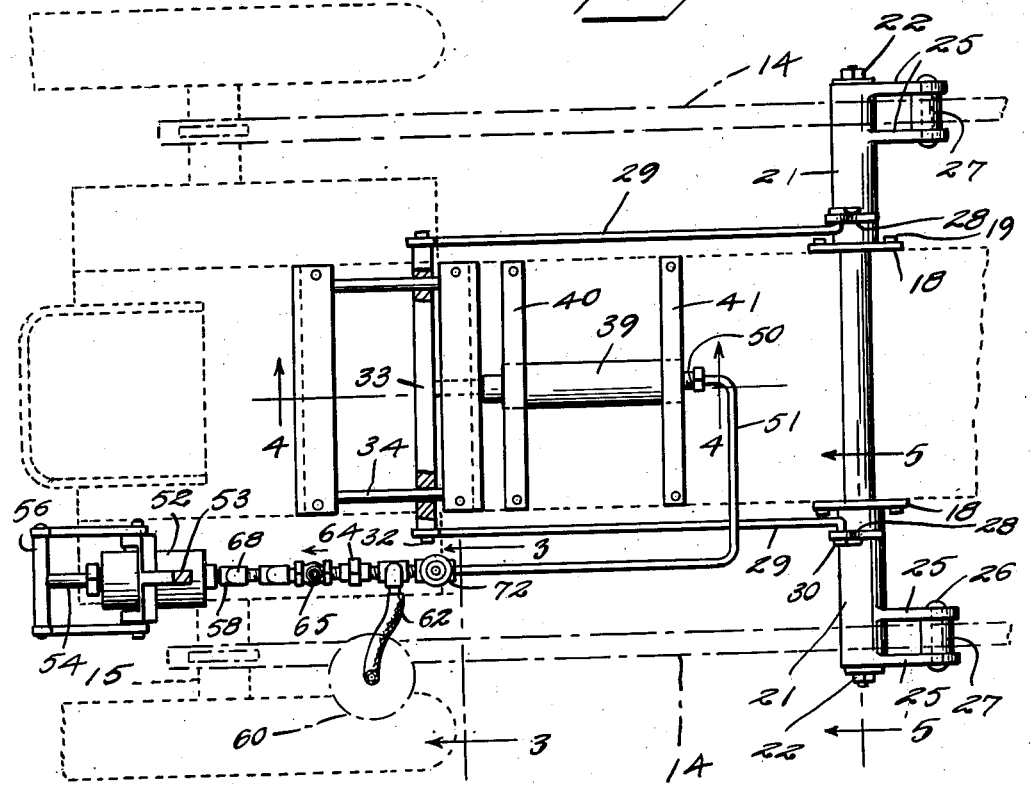
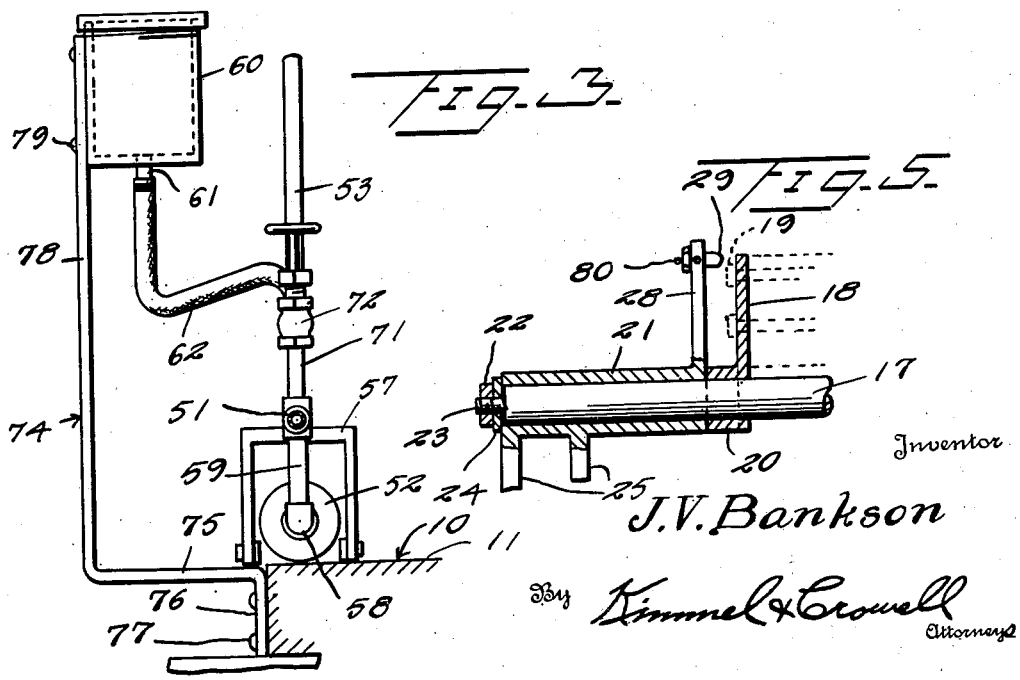
Inventor
J. V. Bankson
By Kimmel & Crowell
Attorneys Patented June 16, 1942

2,286,947

UNITED STATES PATENT OFFICE 2,286,947

HYDRAULIC HOIST

John Virgil Bankson, Greenville, Ohio

Application July 25, 1941, Serial No. 404,073

3 Claims. (Cl. 214—131)

This invention relates to elevating and lowering means for farm implements.

An object of this invention is to provide, as an attachment for a tractor, a hoist which may be used for elevating or lowering an implement such as, for example, a sweep rake.

Another object of this invention is to provide a hoist for attachment to a tractor which may be hydraulically operated and may be connected with a sweep rake or other implement mounted on the tractor and extending from either the front or rear of the tractor. As illustrated in the drawings, the hoist is associated with a sweep rake pivoted to the tractor and extending from the front thereof, but it will be understood that this hoist may be reversed in its position where the implement extends from the rear of the tractor, and may be used with other implements.

With the above objects and such others which may hereinafter appear, the invention consists of the novel construction, combination and arrangement of parts as will be more specifically described and illustrated in the accompanying drawings, wherein is shown an embodiment of the invention, but it is to be understood that changes, variations and modifications may be resorted to which fall within the scope of the invention, as claimed.

In the drawings:

Figure 1 is a detail side elevation, partly in section, of a tractor having a hoist constructed according to an embodiment of this invention mounted thereon for raising or lowering an implement such as a sweep rake or the like.

Figure 2 is a sectional view, taken on the line 2—2 of Figure 1, showing the tractor in dotted lines.

Figure 3 is a sectional view, taken on the line 3—3 of Figure 2.

Figure 4 is a sectional view, taken on the line 4—4 of Figure 2.

Figure 5 is a sectional view, taken on the line 5—5 of Figure 2.

Referring to the drawings the numeral 10 designates generally a tractor structure of conventional construction which includes a pair of longitudinal frame members 11. A sweep rake, generally designated as 12, is pivotally carried by the tractor 10, and includes a rake member 13 which is secured to a pair of draft beams or members 14 extending rearwardly from the rake member 13. The rear end portions of the draft members or beams 14 are pivotally secured to the rear axle 15 of the tractor 10 by means of U-bolts 16.

In order to provide a means whereby the sweep rake 12 may be elevated or lowered I have provided a hoist structure which is constructed in the form of an attachment for mounting on the beams 11 of the tractor 10. This hoist structure includes a horizontally disposed and transversely extending shaft 17 which is positioned below the longitudinal tractor beams 11, and is supported below the beams 11 by means of suspension members including a plate 18 which is fixed by fastening devices 19 to the outer side of the beam 11, and the lower end of each plate 18 has secured thereto or formed integral therewith, a bearing boss or sleeve 20 engaging about the shaft 17. The opposite ends of the shaft 17 extend outwardly beyond the suspension members including the plates 18 and the supporting bearings 20 and the extended portions of the shaft 17 have rockably mounted thereon sleeves 21. The sleeves 21 are held against endwise movement by means of a nut 22 which is threaded on a reduced threaded stud 23 and a washer 24 is interposed between the nut 22 and the adjacent end of a sleeve 21.

Each sleeve 21 has fixed thereto a pair of downwardly extending parallel suspension arms or levers 25 which are disposed adjacent the outer end portion of a sleeve 21. The lower end portions of the levers or arms 25 are connected together by means of a connecting bolt 26 and preferably a roller 27 is mounted on the bolt 26 and engages between the two parallel arms or levers 25. The roller 27, as shown in Figure 1, is adapted to engage beneath a draft member 14 so that upward rocking of the arms or levers 25 will raise the draft members 14 and the rake structure 13 therewith.

Each sleeve 21 has fixed thereto a crank or arm 28 which extends from the sleeve 21 in a direction substantially opposite from the extension of the arms or levers 25. A link 29 is pivotally connected, as at 30, with a crank or arm 28 and is provided at its rear end portion with an eye 31 mounted on a stud or bolt 32 which is carried by a horizontally shiftable head or slide 33. The head or slide 33 extends beneath the two tractor frame members 11 and is slidably mounted on a pair of parallel guide bars 34. The guide bars 34 are fixed between a pair of angle members 35 and 36 which are secured by fastening devices 37 and 38 respectively to the under-sides of the tractor frame members 11. A hydraulic cylinder 39 is disposed below the tractor frame members 11, being supported substantially in the longitudinal center of the tractor 10 by means of a pair of supporting bars 40 and 41. The supporting bars 40 and 41 are fixed between the two tractor frame members 11. The cylinder 39 has slidable therein a piston 42 which has secured thereto one end of a connecting rod 43. The connecting rod 43 extends through one head 44 carried by the cylinder 39 and the opposite or outer end of the connecting rod 43 is secured, as at 45, to the center of the cross head 33. The head 44 may be provided with an extension 46 which may be mounted in an opening 47 formed in the vertical side 48 of the angle member 36.

The opposite head 49 of the cylinder 39 has a nipple or extension 50 extending therefrom with which a fluid conducting pipe 51 is adapted to be connected.

A pump or pressure member 52 is mounted on the tractor 10, adjacent the rear thereof, and is provided with a piston operating lever 53 which is connected with the piston rod 54 of the pump by means of a pair of links 55. The links 55 may be connected to a cross head 56 which is fixed to the piston rod 54 and the lower end portion of the lever or handle 53 may be bifurcated, as at 57, for engagement on opposite sides of the pump 52. The pump cylinder 52 has a combined intake and outlet connection 58 connected with one end thereof and, in the present instance, the forward end, and a connection 58 is connected to a short length of pipe 59.

A fluid reservoir 60 is disposed in an elevated position adjacent the rear portion of the tractor 10, and has a nipple 61 in the bottom wall thereof with which a flexible hose 62 is adapted to be connected. The opposite end of the flexible hose 62 is connected with one side of a T-coupling 63 interposed in a pipe line 64. A rearwardly opening check valve 65 is interposed in the pipe line 64 and the pipe line 64 is formed with a vertically disposed and downwardly extending branch 66 which is connected to one branch of a second T-coupling 67. The coupling 67 is connected with the branch or pipe 59 by means of an L 68. A pipe 69 is connected with another branch of the T-connection 67 and a forwardly opening check valve 70 is interposed in the pipe 69 between the branch 66 and the second vertical branch 71. The vertical branch 71 is connected with the pipe 64 through a valve structure 72. The valve structure 72 is manually operable and is adapted to provide means for cutting off or establishing communication from the flexible hose 62 to the branch pipe 71. The lower end portion of the branch 71 is connected with one side of a third T-coupling 73 which is connected with the pipe 69. The pipe 51 is connected at its rear end with the T-coupling 73.

The reservoir 60 is adapted to be supported in an elevational position by means of a substantially L-shaped supporting bracket 74 which has formed integral with the lower leg 75 thereof, a right angular extension 76. The extension 76 may be secured by fastening devices 77 to the outer side of one of the tractor frame members 11. The upper end portion of the vertical leg 78 of the bracket 74 may be secured by fastening devices 79 to the reservoir 60. A flexible member 80 may be connected at one end with the crank 28 and at the other end with the rear side of the rake structure 13. Preferably, there are two of these flexible members 80, one on each side of the tractor 10, and connected one with each of the cranks 28.

In the use and operation of this hoist structure the shaft 17 is adapted to be mounted beneath the frame structure of the tractor 10 by the suspension members 18 and 20 and the sleeves 21 are then rockably mounted on the extended end portions of the shaft 17. The draft members 14 of the implement 12 are loosely disposed between the arms or levers 25 and rest on the rollers 27 carried by the arms 25.

In the event it is desired to raise the implement 12, the valve member 72 is moved to a closed position and the pump 52 is operated by the handle 53. Movement of the piston within the pump 52 in one direction will draw the liquid from the reservoir 16, past the rearwardly opening check valve 65 through the branch 66, the coupling 67, the elbow 68, the pipe 69 and the coupling 58. Movement of the handle or lever 53 in a forward direction will force the liquid out of the cylinder of the pump 52 and at this time the check valve 65 will be closed and the pressure of the fluid will open the forwardly opening check valve 70 so that the liquid will flow through the pipe 69, the coupling 73 and the pipe 51 into the forward end portion of the pressure cylinder 39. The pressure of the liquid in the cylinder 39 will move the piston 42 rearwardly and, at the same time, the sleeves 21 will be rocked by rearward pull on the cranks 28 effected by the connecting links 29 as the cross head 33 slides rearwardly on the guides 34.

In the event it is desired to lower the implement 12, the valve 72 may be moved to an open position for establishing communication from the pipe 51 through the branch 71, the valve 72, the coupling 63 and the flexible hose 62 to the reservoir 60. The weight of the implement 12 will gravitatingly swing the levers or arms 25 downwardly and rock the cranks 28 forwardly at their upper ends so as to shift the piston 42 forwardly and forcibly eject the liquid from the piston 39.

While I have shown the hoist mounted on the tractor for raising or lowering an implement such as a sweep rake or the like, which is disposed at the forward end of the tractor, it will be understood that the hoist may be mounted for raising or lowering an implement of a different character which extends from the rear of the tractor.

What I claim is:

1. An implement for attachment to a tractor frame comprising a horizontally disposed transversely extending supporting shaft, means supporting said shaft from the tractor frame, a pair of sleeves pivotally mounted on said shaft adjacent the opposite ends thereof, a pair of parallel arms fixed to each sleeve and engageable on opposite sides of an implement beam, a connecting member connecting the free end portions of said arms together and engageable beneath the implement beam, a lever fixed to each sleeve and extending therefrom substantially opposite from said arms, a hydraulic operating member, means connecting said operating member with said levers, and a hydraulic hand pump for actuating said operating member.

2. An implement hoist for attachment to a tractor frame comprising a horizontally disposed transversely extending supporting shaft, means supporting said shaft from the tractor frame, a pair of sleeves pivotally mounted on said shaft adjacent the opposite ends thereof, a pair of parallel arms fixed to each sleeve and engageable on opposite sides of an implement beam, a connecting member connecting the free end portions of said arms together and engageable beneath the implement beam, a lever fixed to each sleeve and extending therefrom substantially opposite from said arms, a hydraulic operator, a guide means fixed to and disposed below said frame, a cross head slidable on said guide means fixed to and operable by said operator, means connecting said cross head to said levers for rocking of said levers and arms upon movement of said cross head, and a hydraulic hand operated pump for actuating said hydraulic operator.

3. In combination, a tractor frame, an implement pivotally carried by said frame and including a pair of parallel draft bars pivoted at one end to said frame, a pair of lift members slidably engaging beneath said bars intermediate the opposite ends thereof, means pivotally supporting said members from said frame, a pair of parallel guide members, means supporting said guide members from said frame, a cross head slidably engaging said guide members, means connecting said guide members with said lift members for rocking of said lift members upon movement of said cross head along said guide members, a hydraulic pressure member connected with said cross head, and a hydraulic hand pump connected with said pressure member.

JOHN VIRGIL BANKSON.